United States Patent [19]

Pagilagan

[11] 4,369,305

[45] Jan. 18, 1983

[54] POLYAMIDE MOLDING RESIN FROM PACM HAVING SPECIFIC STEREO ISOMER RATIO

[75] Inventor: Rolando U. Pagilagan, Parkersburg, W. Va.

[73] Assignee: E. I. Du Pont de Nemours and Company, Wilmington, Del.

[21] Appl. No.: 255,740

[22] Filed: Apr. 20, 1981

Related U.S. Application Data

[63] Continuation-in-part of Ser. No. 208,648, Nov. 20, 1980, abandoned.

[51] Int. Cl.³ .............................................. C08G 69/26
[52] U.S. Cl. .................................... 528/338; 528/336; 528/346; 528/347; 528/349
[58] Field of Search ................ 528/338, 346, 347, 349

[56] References Cited

U.S. PATENT DOCUMENTS

| | | | |
|---|---|---|---|
| 2,696,482 | 12/1954 | Pease ...................................... | 260/78 |
| 3,597,400 | 8/1971 | Kashiro et al. .................... | 260/78 R |
| 3,642,941 | 2/1972 | Schneider et al. .................. | 260/857 |
| 4,207,411 | 6/1980 | Shue .................................... | 528/338 |
| 4,232,145 | 11/1980 | Schmid et al. ...................... | 528/324 |
| 4,264,762 | 4/1981 | Cordes et al. ....................... | 528/338 |

*Primary Examiner*—Harold D. Anderson

[57] ABSTRACT

Novel tetrapolymers are described consisting of equimolar amounts of (1) isophthalic and terephthalic acids, and (2) hexamethylene diamine and PACM in specific amounts, which produce transparent molded articles.

2 Claims, No Drawings

POLYAMIDE MOLDING RESIN FROM PACM HAVING SPECIFIC STEREO ISOMER RATIO

CROSS REFERENCE TO RELATED CASES

This application is a continuation-in-part of application Ser. No. 208,648, filed Nov. 20, 1980, now abandoned.

FIELD OF THE INVENTION

This invention relates to polyamide compositions and more particularly to polyamides that are moldable into transparent articles.

BACKGROUND OF THE INVENTION

Heretofore several methods for preparing transparent polyamides for use in articles such as films, pipes, rods and containers have been proposed. One such method proposes using bis(p-aminocyclohexyl)methane as the diamine component and polycondensing it with isophthalic acid (U.S. Pat. No. 2,696,482). Although polyamides obtained by this method are excellent in transparency, they have high melt viscosities, resulting in difficulty in shaping molded articles.

Another proposed method uses a combination of terephthalic acid and isophthalic acid as the dicarboxylic acid component, and polycondensing them with hexamethylene diamine containing alkyl groups. However, polyamides obtained by this method have poor resistance to organic solvents such as methanol.

Still another proposed method uses selected amounts of bis(p-aminocyclohexyl)methane, hexamethylene diamine, terephthalic acid and isophthalic acid to make a copolymer (U.S. Pat. No. 3,597,400). However, the melt viscosity of such copolymers is still high, and the copolymers result in articles having undesirable dimensional changes in some solvents and undesirable water absorption levels.

It is the purpose of this invention to provide a polyamide resin of low melt viscosity that produces transparent articles having low dimensional change in solvents and low water absorption levels.

SUMMARY OF THE INVENTION

A polyamide molding resin consisting essentially of a polycondensate composed of units of
 (a) 60–90 mole percent isophthalic acid, based on total acids present;
 (b) 10–40 mole percent terephthalic acid, based on total acids present;
 (c) 98–92 mole percent hexamethylene diamine based on total amines present; and
 (d) bis(p-aminocyclohexyl)methane in which the mole percent present is between a lower limit of 2 mole percent of the total amines present and an upper mole percent limit which is 1/11 of the mole percent of (a) present, and in which at least 59 percent by weight of the bis(p-aminocyclohexyl)methane is either the trans, trans isomer or the cis, trans isomer,
 provided the amount of acids (a) and (b) together comprise about 100 mole percent and provided the amount of amines (c) and (d) together comprise about 100 mole percent, said polyamide having a melt viscosity at 280° C. of less than 30,000 poises.

DESCRIPTION

The polyamide molding resins of this invention exhibit melt viscosities at 280° C. of less than 30,000 poise, preferably less than 20,000 poise, measured at a shear stress of $10^5$ dynes/cm$^2$.

The polyamides can be prepared by known polymer condensation methods in the composition ratios mentioned above. In order to form high polymers the total moles of the acids employed should equal the total moles of the diamines employed.

Bis(p-aminocyclohexyl)methane (PACM hereinafter) used as one of the diamine components in this invention is usually a mixture of stereoisomers. In the present invention the ratio of these isomers is important. At least 59% by weight of the PACM must be either the trans, trans or cis, trans isomer in order to obtain a polyamide having surprisingly high heat distortion temperature.

In addition to isophthalic acid and terephthalic acid, derivatives thereof, such as the chlorides, may be used to prepare the polymers.

The polymerization may be performed in accordance with known polymerization techniques, such as melt polymerization, solution polymerization and interfacial polymerization techniques, but it is preferred to conduct the polymerization in accordance with melt polymerization procedures. This procedure produces polyamides having high molecular weights. In melt polymerization, PACM, hexamethylene diamine, terephthalic acid and isophthalic acid are mixed in such amounts that the ratio of the diamine components and the dicarboxylic acid components will be substantially equimolar and that the composition of these four monomers will satisfy the mole percents recited above. The components are heated at temperatures higher than the melting point of the resulting polyamide but lower than the degradation temperature thereof. Because of the volatility of the hexamethylene diamine, a slight excess is usually employed in the mix. The heating temperature is in the range of 170° to 300° C. The pressure can be in the range of from atmospheric pressure to 300 psig.

The method of addition of starting monomers is not critical. For example, salts of a combination of the diamines and acids can be made and mixed. It is also possible to disperse a mixture of the diamines in water, add a prescribed amount of a mixture of acids to the dispersion at an elevated temperature to form a solution of a mixture of nylon salts, and subject the solution to the polymerization.

If desired, a monovalent amine or, preferably, an organic acid, may be added as viscosity adjuster to a mixture of starting salts or an aqueous solution thereof.

It is also possible to add to the polyamides of this invention various conventional additives, such as heat stabilizers, UV stabilizers, glass or mineral reinforcing agents, toughening agents, flame retardants, plasticizers, antioxidants and pigments either before or after the polymerization.

The polyamides of the present invention possess excellent transparency, chemical resistance, heat stability and melt shapeability, and hence are valuable in the preparation of various shaped and molded articles such as films, plates, pipes, rods and containers of various types.

This invention will be explained more detailedly hereinbelow by referring to examples.

PREPARATION OF TETRAPOLYMER

The copolymer resins were prepared in an autoclave by reacting the aqueous salt solutions of the respective resins at a temperature normally below 300° C. and a pressure normally below 300 psig for a suitable time, usually about two hours. When most of the water was evaporated, the pressure was gradually bled to atmospheric and the reaction was allowed to continue under vacuum until the desired molecular weight was attained. If lower molecular weight is desired, the final stage of the reaction can be carried out at atmospheric conditions rather than under vacuum.

EXAMPLE 1

Preparation of Copolymer of Salt Ratio 6I/6T/PACM I/PACMT (66.8/28.6/3.2/1.4)

6I refers to hexamethylene diamine (HMD) and isophthalic acid (I) units, 6T refers to HMD and terephthalic acid (T) units, PACM I refers to units of PACM and I, and PACM T refers to units of PACM and T.

To 140 lb of water were added 48.8 lb of a solution of hexamethylene diamine (HMD) in water (82.03% HMD) and 2.6 lb of bis(p-aminocyclohexyl)methane containing over 59% cis, trans isomer and containing 20% trans, trans isomer. The mixture was heated and 41.2 lb of isophthalic and 17.7 lb of terephthalic acids were added. The pH of the solution was adjusted to 8.62 with small amounts of HMD. To the salt solution were added 49 grams of sodium phenylphosphinate heat stabilizer, 97 grams of 4,4'-butylidenebis(6-tert-butyl-m-cresol) antioxidant, 20 ml of a 10% emulsion of dimethylpolysiloxane as antifoaming agent, and 14 ml of glacial acetic acid for molecular weight control. The temperature of the solution was maintained at 70°–80° C.

The salt mixture was then charged into an autoclave. The mixture was heated to 175° C. and subjected to a pressure of 180 psig. The water was slowly bled off while maintaining the pressure at 180 psig until the solution was concentrated enough and the temperature of the batch reached 226° C. The pressure was then slowly reduced to atmospheric and vacuum was applied. The batch temperature was then allowed to rise to about 270° C. When the desired molecular weight was attained the autoclave was pressured with nitrogen gas and the polymer was extruded into cylindrical strand, quenched in water, and cut into pellets.

In terms of individual acids and diamines employed the tetrapolymer contained 70% isophthalic acid and 30% terephthalic acid, for a total of 100% acid; and 96.5% HMD, and 3.5% PACM, for a total of 100% diamine.

CONTROL A

Preparation of 6I/6T/PACM I/PACM T (63.5/27.2/6.5/2.8)

This polymer was prepared as in the above example.

To 140 lb of water were added 46.5 lb HMD (concentration 82.03%) and 5.25 lb of the same bis(p-aminocyclohexyl)methane used in Example 1. The mixture was heated and 41.2 lb isophthalic and 17.7 lb terephthalic acids were added. The pH was then adjusted to 8.60 with small amounts of HMD. To the salt solution were added 49 grams of sodium phenylphosphinate, 97 grams of 4,4'-butylidenebis(6-tert-butyl-m-cresol), 20 ml of a 10% emulsion of polydimethylsiloxane, and 14 ml of glacial acetic acid.

CONTROL B

Preparation of 6I/6T/PACM I/PACM T (57.6/24.7/12.4/5.3)

The salt charge was prepared as above using 140 lb water, 44.2 lb of hexamethylene diamine (concentration 81.45%), and 10.5 lb of the same bix(p-aminocyclohexyl)methane used in Example 1. The diamines were reacted with 41.2 lb isophthalic acid and 17.7 lb terephthalic acids and pH adjusted to 8.50. To the salt solution were added 49 grams of sodium phenylphosphinate, 97 grams of 4,40'-butylidenebis(6-tert-butyl-m-cresol), 20 ml of a 10% emulsion of polydimethylsiloxane, and 14 ml of glacial acetic acid.

CONTROL C

Preparation of 6I/6T/PACM I/PACMT (63.5/27.2/6.5/2.8)

This polymer is the same as the polymer of Example 1 except that the PACM used contained about 48% trans, trans isomer and 40% cis, trans isomer.

Controls A and B are representative of U.S. Pat. No. 3,597,400.

EFFECT OF SOLVENTS

Weight and dimensional change in various solvents were determined by immersing molded bars (5"×½"×¼") of the copolymers in the solvent for the time indicated and measuring the weight and dimensions periodically.

Results are as follows in Tables 1–5.

TABLE 1

WEIGHT AND DIMENSIONAL CHANGE IN METHANOL AT ROOM TEMP.

|  | Days in Solvent | % Weight Gain | % Dimensional Change | | |
|---|---|---|---|---|---|
|  |  |  | Width | Thickness | Length |
| Example 1 | 6 | 7.4 | 3.1 | 6.4 | 0.15 |
|  | 13 | 9.9 | 4.3 | 8.4 | 0.30 |
|  | 27 | 12.7 | 5.7 | 11.2 | 0.50 |
|  | 62 | 16.3 | 4.9 | 19.2 | 0.77 |
|  | 96 | 17.5 | 4.9 | 22.0 | 1.01 |
| Control A | 6 | 8.6 | 4.5 | 8.4 | 0.30 |
|  | 13 | 11.4 | 5.7 | 10.8 | 0.44 |
|  | 27 | 14.4 | 5.3 | 16.0 | 0.62 |
|  | 62 | 18.0 | 4.3 | 24.8 | 0.80 |
|  | 96 | 18.6 | 4.1 | 25.6 | 1.01 |
| Control B | 6 | 10.4 | 11.0 | 10.4 | 0.51 |
|  | 13 | 13.6 | 5.7 | 15.5 | 0.53 |
|  | 27 | 15.6 | 4.1 | 24.3 | 0.53 |
|  | 62 | 20.4 | 4.1 | 31.1 | 0.78 |
|  | 96 | 20.4 | 4.1 | 31.1 | 0.78 |

TABLE 2

WEIGHT AND DIMENSIONAL CHANGE IN GASOHOL (20% EtOH) AT ROOM TEMP.

|  | Days in Solvent | % Weight Gain | % Dimensional Change | | |
|---|---|---|---|---|---|
|  |  |  | Width | Thickness | Length |
| Example 1 | 6 | 3.4 | 1.2 | 2.6 | 0.10 |
|  | 13 | 4.4 | 1.8 | 3.6 | 0.18 |
|  | 27 | 5.4 | 1.8 | 4.0 | 0.18 |
|  | 62 | 6.6 | 2.5 | 5.2 | 0.26 |
|  | 96 | 7.5 | 3.1 | 6.0 | 0.32 |
| Control A | 6 | 4.2 | 1.4 | 3.2 | 0.26 |
|  | 13 | 5.4 | 2.3 | 4.4 | 0.32 |
|  | 27 | 6.6 | 2.9 | 6.0 | 0.38 |
|  | 62 | 8.2 | 4.1 | 7.2 | 0.46 |
|  | 96 | 9.2 | 4.9 | 8.4 | 0.54 |
| Control B | 6 | 5.1 | 2.1 | 3.2 | 0.30 |

TABLE 2-continued
WEIGHT AND DIMENSIONAL CHANGE IN GASOHOL (20% EtOH) AT ROOM TEMP.

| Days in Solvent | % Weight Gain | % Dimensional Change Width | Thickness | Length |
|---|---|---|---|---|
| 13 | 6.8 | 3.6 | 5.2 | 0.47 |
| 27 | 8.2 | 5.2 | 8.0 | 0.65 |
| 62 | 10.2 | 6.6 | 10.0 | 0.77 |
| 96 | 11.5 | 7.0 | 12.0 | 0.75 |

TABLE 3
WEIGHT AND DIMENSIONAL CHANGE IN DIESEL FUEL AT ROOM TEMP.

| | Days in Solvent | % Weight Gain | % Dimensional Change Width | Thickness | Length |
|---|---|---|---|---|---|
| Example 1 | 6 | 0.04 | 0 | 0.4 | 0.04 |
| | 13 | 0.03 | 0 | 0.4 | 0.04 |
| | 27 | 0.04 | 0 | 0.4 | 0.05 |
| | 62 | 0.05 | 0.2 | 0.4 | 0.05 |
| | 96 | 0.06 | 0.2 | 0.4 | 0.05 |
| Control A | 6 | 0.04 | 0 | 0.4 | 0.04 |
| | 13 | 0.04 | 0 | 0.4 | 0.04 |
| | 27 | 0.05 | 0 | 0.4 | 0.04 |
| | 62 | 0.08 | 0 | 0.4 | 0.04 |
| | 96 | 0.08 | 0 | 0 | 0.04 |
| Control B | 6 | 0.06 | 0 | 0 | 0.02 |
| | 13 | 0.05 | 0 | 0 | 0.02 |
| | 27 | 0.06 | 0 | 0 | 0.02 |
| | 62 | 0.09 | 0 | 0 | 0.02 |
| | 96 | 0.10 | 0 | 0 | 0.04 |

TABLE 4
WEIGHT AND DIMENSIONAL CHANGE IN TOLUENE AT ROOM TEMP.

| | Days in Solvent | % Weight Gain | % Dimensional Change Width | Thickness | Length |
|---|---|---|---|---|---|
| Example 1 | 6 | 0.04 | 0.2 | 0.4 | 0.03 |
| | 13 | 0.10 | 0.2 | 0.4 | 0.03 |
| | 27 | 0.13 | 0.2 | 0.4 | 0.03 |
| | 62 | 0.22 | 0.2 | 0.4 | 0.03 |
| | 96 | 0.38 | 0.2 | 0.4 | 0.06 |
| Control A | 6 | 0.06 | 0.2 | 0 | 0.06 |
| | 13 | 0.11 | 0.2 | 0 | 0.06 |
| | 27 | 0.15 | 0.2 | 0 | 0.06 |
| | 62 | 0.24 | 0.2 | 0 | 0.10 |
| | 96 | 0.40 | 0.2 | 0 | 0.10 |
| Control B | 6 | 0.08 | 0.2 | 0 | 0.02 |
| | 13 | 0.12 | 0.2 | 0 | 0.02 |
| | 27 | 0.18 | 0.2 | 0 | 0.02 |
| | 62 | 0.28 | 0.2 | 0 | 0.06 |
| | 96 | 0.45 | 0.2 | 0 | 0.06 |

TABLE 5
WEIGHT AND DIMENSIONAL CHANGE IN METHYLENE CHLORIDE AT ROOM TEMP.

| | Days in Solvent | % Weight Gain | % Dimensional Change Width | Thickness | Length |
|---|---|---|---|---|---|
| Example 1 | 6 | 3.4 | 0.8 | 1.6 | 0.06 |
| | 13 | 4.6 | 1.2 | 2.4 | 0.10 |
| | 27 | 6.2 | 1.4 | 3.2 | 0.09 |
| | 62 | 9.0 | 2.2 | 4.8 | 0.24 |
| | 96 | 11.2 | 2.9 | 6.0 | 0.26 |
| Control A | 6 | 3.3 | 1.0 | 1.6 | 0.08 |
| | 13 | 4.6 | 1.2 | 2.4 | 0.10 |
| | 27 | 6.2 | 1.6 | 3.2 | 0.18 |
| | 62 | 8.9 | 2.2 | 4.4 | 0.26 |
| | 96 | 11.2 | 2.9 | 5.6 | 0.28 |
| Control B | 6 | 3.2 | 0.8 | 1.2 | 0.06 |
| | 13 | 4.5 | 1.2 | 2.0 | 0.10 |

TABLE 5-continued
WEIGHT AND DIMENSIONAL CHANGE IN METHYLENE CHLORIDE AT ROOM TEMP.

| Days in Solvent | % Weight Gain | % Dimensional Change Width | Thickness | Length |
|---|---|---|---|---|
| 27 | 6.3 | 1.6 | 2.8 | 0.16 |
| 62 | 9.1 | 2.4 | 4.0 | 0.24 |
| 96 | 11.3 | 2.9 | 5.2 | 0.26 |

MOISTURE ABSORPTION

Moisture absorption data were obtained by measuring the weight gain after immersion of samples in boiling water or boiling water containing potassium acetate (1.25 lbs KAC/1 lb $H_2O$) for 24 hours.

Results are shown in Table 6.

TABLE 6

| Code | 50% RH (Boiling KAC) | 100% RH (Boiling Water) |
|---|---|---|
| Example 1 | 1.86% | 5.29% |
| Control A | 2.14% | 6.32% |
| Control B | 2.04% | 8.13% |

The polymer of Example 1 exhibited less moisture absorption than Controls A or B.

MELT VISCOSITY

Dried samples were tested in a constant rate rheometer at 280° C. The force required to extrude resin was measured at a series of predetermined piston speeds varying from 10 inches per minute to 0.02 inch per minute, and shear stress, shear rate and apparent melt viscosity are then calculated.

The constant rate rheometer consists of a heated extrusion assembly equipped with a piston which can be driven at predetermined speeds by means of an Instron tester. The force required to extrude the resin through the orifice is measured by a compression load cell and recorded. A 0.0468-inch orifice having an L/D=16 was used for all samples.

The required amount of resin is poured into the heated barrel from a test tube and compacted using hand pressure. The piston is then installed and lowered (by means of the Instron crosshead) to just make contact with the polymer and a timer started. After 180 seconds, the polymer is compressed (at speed of 1 inch per minute) until polymer exits the orifice; the piston is then stopped. After an additional period of 120 seconds (total time 300 seconds) a series of extrusions at different piston speeds is made and the force required to extrude at each speed is recorded. The shear stress, shear rate and apparent melt viscosity are then calculated from this data.

For any given shear stress value, the apparent melt viscosity of the polymer of Example 1 was lower than that of the polymers of Controls A and B, thus showing that the polymer of Example 1 is easier to process in a molding machine and easier to remove from the autoclave during manufacture.

HEAT DISTORTION TEMPERATURE

Heat Distortion Temperature (HDT) was determined by annealing the polymer at 100° C. for 30 mins prior to testing, according to ASTM D-648.

The heat distortion temperatures of the product of Control C and of the product of Example 1 were determined and compared as follows:

|  | 66 psi stress | 264 psi stress |
|---|---|---|
| Control C | 125° C. | 123° C. |
| Example 1 | 132° C. | 124° C. |

This data shows that the tetrapolymer made from PACM used in Example 1 (over 59% requisite isomer) has a higher HDT compared to a polymer made from PACM used in Control C.

I claim:

1. A polyamide molding resin consisting essentially of a polycondensate composed of units of
   (a) 60–90 mole percent isophthalic acid, based on total acids present;
   (b) 10–40 mole percent terephthalic acid, based on total acids present;
   (c) 98–92 mole percent hexamethylene diamine, based on total amines present; and
   (d) bis(p-aminocyclohexyl)methane in which the mole percent present is between a lower limit of 2 mole percent of the total amines present and an upper mole percent limit which is 1/11 of the mole percent of (a) present, and in which at least 59 percent by weight of the bis(p-aminocyclohexyl)methane is either the trans, trans isomer or the cis, trans isomer,
   provided the amount of acids (a) and (b) together comprise about 100 mole percent and provided the amount of amines (c) and (d) together comprise about 100 mole percent, said polyamide having a melt viscosity at 280° C. of less than 30,000 poises.

2. A polyamide molding resin defined as in claim 1 in which the components are present in the following amounts
   (a) about 70 mole percent
   (b) about 30 mole percent
   (c) about 96.5 mole percent
   (d) about 3.5 mole percent.

* * * * *